Jan. 16, 1934.    L. H. VON OHLSEN    1,943,498
SYSTEM AND APPARATUS FOR ELECTRIC REGULATION
Filed Oct. 15, 1930    2 Sheets-Sheet 1

INVENTOR
Louis H. Von Ohlsen
BY Janney, Blair & Curtis
ATTORNEY

Jan. 16, 1934.    L. H. VON OHLSEN    1,943,498
SYSTEM AND APPARATUS FOR ELECTRIC REGULATION
Filed Oct. 15, 1930    2 Sheets-Sheet 2

Louis H. Von Ohlsen
INVENTOR
BY Janney, Blair & Curtis
ATTORNEY

Patented Jan. 16, 1934

1,943,498

UNITED STATES PATENT OFFICE 1,943,498

SYSTEM AND APPARATUS FOR ELECTRIC REGULATION

Louis H. Von Ohlsen, New Haven, Conn., assignor to The Safety Car Heating & Lighting Company, a corporation of New Jersey Application October 15, 1930. Serial No. 488,877

24 Claims. (Cl. 172—239)

This invention relates to a system and apparatus for electric regulation and more particularly to a system and apparatus for speed control of, for example, an electric motor.

One of the objects of this invention is to provide a practical and reliable system and apparatus for dependably effecting the regulation of the speed of, for example, an electric motor. Another object is to provide an apparatus of the above-mentioned character that will be free from undue and cumbersome complications, that will be inexpensive and characterized by ease and convenience of installation, and capable of thoroughly dependable action in practical use. Another object is to provide a system and apparatus of the above-mentioned character in which a wide range of change of regulation or control may be effected in a simple, efficient and reliable manner. Another object is to provide a system and apparatus for electric regulation in an electric circuit embodying the advantages of a variable resistance of the compressible carbon pile type but which will be free from certain limitations as to range of action and/or of capacity of the carbon pile. Another object is to provide a system and apparatus of the above-mentioned nature that will be well adapted to meet the widely varying conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
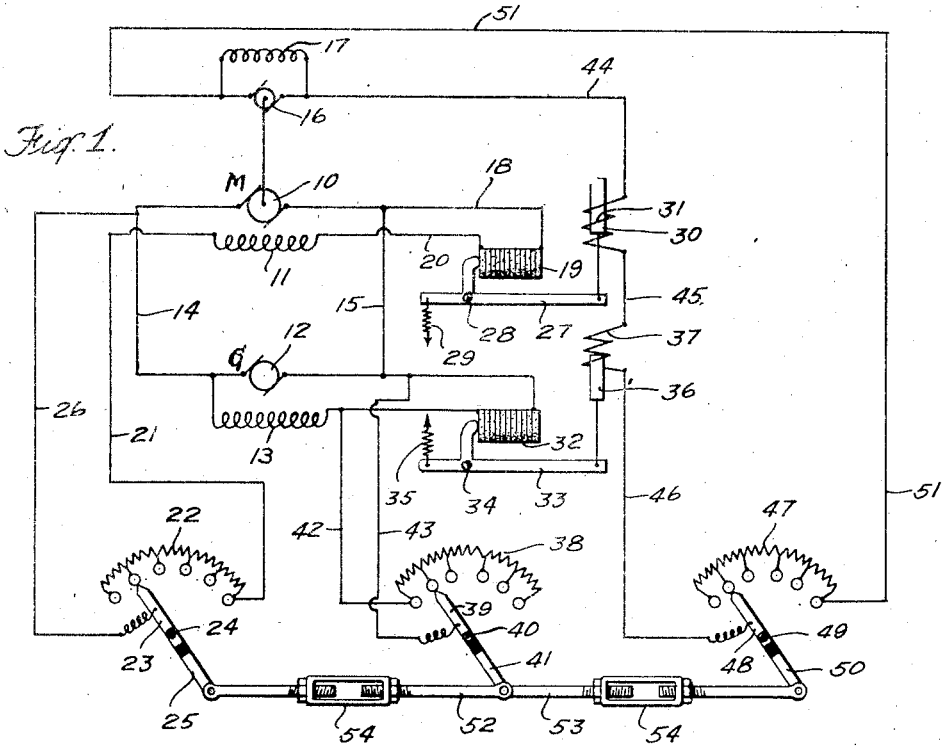
Figure 2:
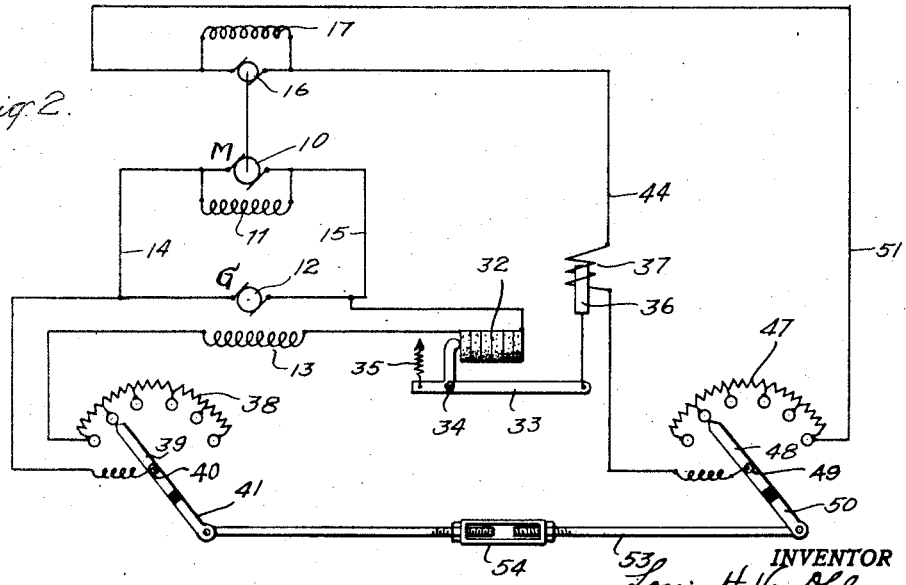
Figure 3:
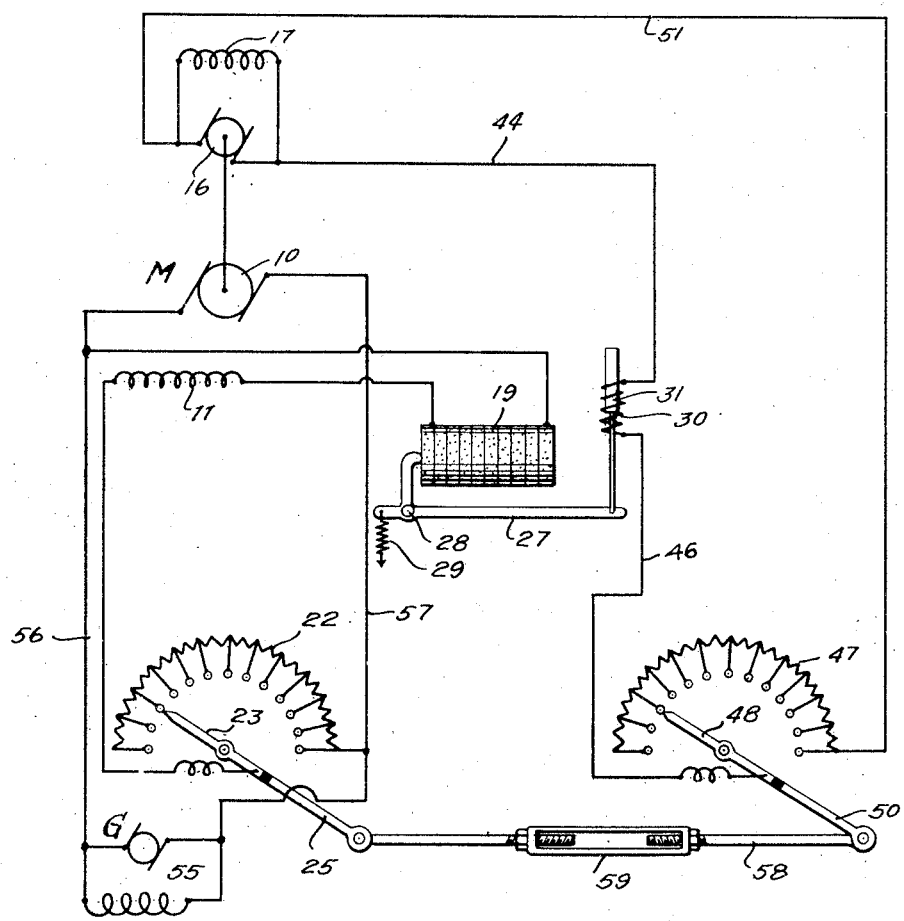

In the accompanying drawings, in which are shown several of the various possible embodiments of my invention, Figure 1 is a diagrammatic showing of the apparatus and circuit arrangements employed in controlling or regulating the speed of a driving motor;

Figure 2 is a like diagrammatic showing of a simpler form or embodiment of certain features of my invention, and Figure 3 is a similar diagrammatic view illustrating another simpler form or embodiment of certain features of my invention.

Similar reference characters refer to similar parts throughout the various views in the drawings.

Referring now more particularly to Figure 1, I have diagrammatically indicated at 10 an electric motor, illustratively of the shunt-wound direct-current type, having, therefore, a shunt field 11 and deriving energy from a generator 12, preferably also of the direct-current shunt-wound type, and having, therefore, a shunt-exciting field 13; the generator 12 may be driven from any suitable source of motive power, preferably at substantially constant speed, and its output is furnished to the motor 10 through the main line conductors 14 and 15. The motor 10 may be considered as illustrative of a motor driving any apparatus in which constancy of speed at any one of a relatively wide range of standards is to be maintained.

Motor 10 drives a small generator 16, which may be of the shunt-wound type and hence may have a shunt field 17; generator 16 is constructed, in any suitable manner, to be relatively sensitive in the voltage of its output to changes in speed of drive of the generator. Hence the voltage of the generator 16 will change as the speed of the motor 10 changes.

Shunt field 11 of motor 10 is connected in a circuit which extends from main line conductor 15, thence by way of conductor 18 to one end of a compressible carbon pile resistance 19, conductor 20, through field winding 11, conductor 21, variable resistance 22, the latter preferably in the form of a step-by-step resistance wire rheostat having a contactor 23 pivoted at 24 and operated by an insulated arm 25, thence from contactor 23 by way of conductor 26 to the other main line 14.

Carbon pile 19 is operated upon by a bell crank lever 27, pivoted at 28, a spring 29 acting upon the lever 27 in a direction to cause the latter to relieve the compression of the pile 19. The lever 27 has connected to it the bore 30 of a solenoid, the winding 31 of which, connected to be responsive to the voltage of the generator 16, as will be more clearly described hereinafter, acts, when energized above a predetermined value, to cause movement of the bell crank lever 27 in clockwise direction and hence in a direction in opposition to the spring 29, to effect a compression of the pile 19 and hence a decrease in the resistance thereof.

The voltage of the generator 12 supplied to the motor 10 is preferably variable and as illustrative of how such variation of the voltage of the generator 12 may be achieved, the shunt field winding 13 is connected in series with a carbon pile 32 acted upon by a bell crank lever 33 pivoted at 34, a spring 35 acting upon the lever in a direction to cause the latter to increase the compression of the pile 32. Connected to the lever 33 is the core 36 of a solenoid, the winding 37 of which, connected to be responsive to changes in the voltage of the generator 16, as will be more clearly described hereinafter, acts, when energized above a certain value, to oppose the action of spring 35 and cause the pressure on the carbon pile 32 to be relieved and its resistance increased.

The range of action of the carbon pile 32 is variable preferably by way of a rheostat which includes the variable resistance 38 and the contactor 39, the latter, pivoted at 40, being controlled by an insulated arm 41. Conductors 42 and 43 connect the rheostat 38—39 in shunt relation to the carbon pile 32.

As above pointed out, windings 31 and 37 of the two solenoids are connected to be responsive to changes in the output of the generator 16 and, where the solenoids have the same operating characteristics, they may be and preferably are connected in series across the generator 16. Accordingly, the windings 31 and 37 are connected in a circuit which will be seen to extend from one side of the generator 16, conductor 44, winding 31, conductor 45, winding 37, conductor 46, rheostat 47—48, the latter being made of the resistance 47 and the coacting contactor arm 48 pivoted at 49 and controlled by the insulated arm 50, thence by way of conductor 51, back to the other side of the generator 16.

Preferably the contactors 23, 39 and 48 of the rheostats are connected to be moved in unison and as illustrative of a possible way of so conjointly moving these contactors, I have shown the insulated arms 25, 41 and 50 connected together by links 52 and 53, each preferably adjustable as to its length, as by means of the turnbuckle 54, so that the relation of the various rheostats to each other may be predetermined at will.

Considering now certain features of action that take place, let it first be assumed that the various movable parts of the apparatus are in substantially the positions indicated in Figure 1, that the generator 12 is being driven and is supplying energy to the motor 10, and that the motor 10 is driving a suitable load and for the moment at least is operating at the intended or desired speed; under these circumstances, the voltage of the auxiliary generator 16 is of a certain value sufficient to hold the solenoid cores 30 and 36 and the mechanism associated with the latter in a state of substantial equilibrium. As soon, however as a change in speed of the motor 10 takes place, various corrective agencies come into play. If, for example, the speed of the motor 10 decreases, due, for example, to an increase in the load on the motor, the voltage of the auxiliary generator 16 diminishes correspondingly as does likewise the energization of the solenoid windings 31 and 37. The latter become insufficiently strong to hold the parts associated with their respective carbon piles in equilibrium and spring 29 becomes effective to relieve the pressure on the carbon pile 19 while spring 35 becomes effective to increase the pressure on the carbon pile 32.

Carbon pile 19 is thus promptly made to increase the resistance in circuit with the field winding 11 of the motor 10, diminishing the excitation of the latter and as a result the motor 10 begins to speed up; at the same time, however, the carbon pile 32 has been diminished in its resistance so that the excitation of generator 12, through field winding 13, is increased, causing an increase in the voltage of the generator 12 and an increase in the energy supplied to the motor 10, thus also effecting an increase in the speed of the motor 10.

The speed of the motor 10 increases sufficiently to permit the energization of the solenoid windings 31 and 37 to be restored to the normal value, corresponding to the normal or intended voltage and hence speed of the generator 16, whence the carbon-pile-operating mechanisms become again held in a position of rest or equilibrium.

An increase in the speed of motor 10 above the desired or intended value due, for example, to a decrease in the load, results in reversed actions. The energization of the solenoid windings 31 and 37 exceeds the normal or intended energization upon such an increase in speed whence solenoid 30—31, by increasing the pressure on the carbon pile 19, increases the excitation of the shunt field 11 of the motor 10 with resultant reduction in speed of the latter, while solenoid 36—37, by increasing the resistance of carbon pile 32, diminishes the excitation and hence the voltage of the output of the generator 12 with accompanied and resultant reduction in speed of the motor 10.

Should it be desired to cause the motor 10 to maintain constancy of speed at a different standard, for example, at a lower standard than that above-assumed, rheostats 22–23, 38–39, and 47–48 are varied as by causing the operating handles thereof to be conjointly moved in clockwise direction to a suitable extent, for example, to include an additional step in each rheostat where the latter are of the step-by-step type. Such change in the settings of these rheostats brings about a number of changes in action.

Firstly, rheostat 22–23 has been made to diminish the resistance in the circuit of the shunt field 11 of the motor 10, thus extending the range of action of the carbon pile 19 in one direction and causing the range of action of the carbon pile 19 to be effective at a higher value of excitation current in the field circuit of motor 10. With increased excitation, the motor 10 must operate at a lower speed.

Also, rheostat 38–39, shunted about the carbon pile 32, has been increase in ohmic resistance, thus stepping down the excitation supplied the field 13 of the generator 12 and reallocating the range of action of the carbon pile 32 to a lower value of shunt field exciting current. The generator 12 is thus made to supply the motor 10 with energy at a lesser voltage with a substantially corresponding and consequent lowering in the speed of the motor 10.

Rheostat 47–48, included in the energizing circuit of the solenoid windings 31 and 37 has been diminished in ohmic resistance so that now a lesser voltage of the generator 16 will suffice to provide the solenoid coils 31–37 with their normal energizing current.

The system and apparatus is thus reset in a direction to maintain constancy of speed of the motor 10 at a lower value, departures from which result in a functioning and operation of the apparatus that will now be clear in view of what has already been said above.

Should further changes in the standard of speed constancy of the motor 10 be desired, the rheostats are reset either by movement thereof in clockwise direction, as viewed in Figure 1, to effect further reductions in the standard of speed constancy or by movement thereof in counter-clockwise direction to effect increases in the standard of speed constancy to be maintained.

I am thus enabled to achieve an exceedingly wide range of change in the standard of speed constancy which the motor 10 is intended to maintain, it being pointed out in this connection that any one change as above-described is at least two-fold in its effect in that not only is the motor 10 made to operate at a new average or mean value of field exciting current, but also the motor 10 is made to function in response to a different voltage due to the change in voltage of the generator 12.

Moreover, by changing the inter-relation between the rheostats as by varying the lengths of the linkages 52 and 53 or either of them, I am enabled rapidly and conveniently to adapt the various parts of the system and apparatus one to the other even though their characteristics may widely vary. As conducive to a clearer understanding of this and related features of my invention, it may here be pointed out that carbon pile regulators, for example, are usually constructed and designed for commercial uses to have a certain effective range of action and it is sometimes exceedingly difficult if not impossible to effect the dependable incorporation of such a carbon pile in a particular system without having sometimes to resort to such crude and inefficient expedients as removing from or adding to the carbon pile an appropriate number of carbon elements. Particularly difficult is it to adapt a carbon pile regulator to a system where the latter requires a range of action that is outside of or beyond the inherent range of action of the carbon pile itself.

However, by associating with the carbon pile regulator 19 a rheostat like the rheostat 22—23, I am enabled widely to extend the range of action of the carbon pile 19 and, moreover, to suit the latter to the particular characteristics of the particular motor that it is intended to affect. The same is true of the inter-relation between the rheostat 38—39 and the carbon pile 32. In the former instance I have shown the rheostat and the carbon pile in series relation as illustrative of one way in which the change of range of action of the carbon pile may be brought about while in the latter instance I have shown the rheostat and the carbon pile in shunt relation as illustrative of another way of effecting a change in the range of action of the carbon pile. The rheostat 47—48 functions also to make it possible to suit the solenoid windings 31—37 to the particular characteristics of the auxiliary generator 16 though it is to be understood that where the solenoids are not of the same electrical characteristics I prefer to employ a separate rheostat for each solenoid winding, all of the rheostats, after having once been set to suit the carbon pile regulators or windings or the like to the characteristics of the particular circuit or circuits with which they are associated, being then connected together, as by the links 52—53, so that any desired change, throughout a wide range, in the standard of speed constancy to be maintained may be thereafter achieved.

As above pointed out, the system and apparatus of Figure 1 makes it possible to achieve a wide range of change in speed constancy of the driving motor. Where practical conditions of operation require a lesser range of change of speed constancy, the system and apparatus of Figure 2 may be employed. Referring now to Figure 2, the motor 10, with its shunt field 11, is connected across the main line conductors 14—15 leading from the generator 12, the shunt field 13 of which is connected in series with the carbon pile 32 controlled by a solenoid 36—37 and a spring 35 operating thereon through the bell crank lever 33 pivoted at 34 and also in series with the generator field 13 is the rheostat 38—39.

The motor 10, as in the arrangement of Figure 1, drives an auxiliary generator 16 connected by conductors 44—51 to the solenoid winding 37 but through the rheostat 47—48. Operating arms or handles 41—50 of the rheostats are connected to move in unison as by means of the link 53 preferably adjustable as to its length as by means of the turn-buckle 54.

The two rheostats, after having been individually set to suit the carbon pile 32 and the solenoid winding 37 to the characteristics of the respective circuits in which these parts are included are thereupon connected together as by the link 53—54. An increase in speed of the motor 10 above the intended standard results in increasing the energization of the solenoid winding 37 so that the latter is effective to increase the resistance of the carbon pile 32, diminish the excitation of the generator 12, diminish the voltage of the energy supplied by the generator 12 to the motor 10, and thus cause the latter to slow down until the energization of the solenoid winding 37 is restored to normal whence the moving parts associated with the carbon pile 32 are held in a state of equilibrium until a subsequent change in the speed of motor 10 takes place. A decrease in the speed of motor 10 results in substantially reversed actions, the voltage of the generator 12 being increased sufficiently to cause in turn a sufficient increase in the speed of the motor 10 to bring the energization of solenoid winding 37 back to normal.

Should it be desired to cause the motor 10 to maintain a different standard of speed constancy, the rheostats 38—39 and 47—48 are reset, by conjoint movement either in clockwise or counterclockwise direction of their respective contactors. In the former case, as will be now clear in view of what has been set forth in connection with Figure 1, the motor 10 will be maintained at constant speed of a lower value and in the latter case the motor 10 will be made to operate at constant speed of a higher value.

As illustrative of another form of system and apparatus that may be employed where such a wide range of change of standard of speed constancy as may be achieved by the arrangement of Figure 1 is not desired, the system and apparatus of Figure 3 may be employed. In Figure 3, the motor 10 derives its energizing current from any suitable source such as a direct current generator 55 of substantially constant voltage, connected thereto through the conductors 56—57. The shunt field 11 of the motor 10 is connected across the motor-energizing circuit 56—57 in series with a carbon pile 19 and a rheostat 22—23, the carbon pile 19 being controlled by a solenoid 30—31 operating thereon, in opposition to spring 29, through lever 27 pivoted at 28.

Motor 10, as in the arrangement of Figures 1 and 2, drives an auxiliary generator 16 so that variations in the output of the generator 16 are effective to vary the energization of the winding 31 connected to the generator 16 through conductors 44—51 and rheostat 47—48.

After having set the rheostats so that the carbon pile and the winding 31 are suited to the characteristics of the respective circuits with which the carbon pile and the winding are associated, the contactors 23 and 48 of the rheostats are connected together as by the adjustable link 58—59.

Departures in speed of the motor 10 from the intended standard are thus made to correspondingly affect the energization of the solenoid winding 31. Increase in speed causes the generator 16 to increase the energization of winding 31 whereupon the latter pulls down on the solenoid core 30 to diminish the resistance of the carbon pile 19 and thus to increase the excitation supplied the field winding 11 of the motor 10, the speed of the latter being correspondingly diminished until the energization of the winding 31 is restored to normal whereupon the moving parts associated with the carbon pile 19 are held in a state of equilibrium. Should a decrease in the speed of motor 10 take place, reverse actions result, the excitation of the motor 10 being diminished to a sufficient extent to cause the speed of the motor 10 to increase sufficiently to restore the energization of winding 31 again to normal so that the latter may hold the moving parts associated with the carbon pile 19 in a new state of equilibrium.

When it is desired to change the standard of speed constancy to be maintained, the rheostats 22—23 and 47—48 are reset by movement of their contactors, in the specific arrangement shown in Figure 3, either in clockwise direction or counter-clockwise direction. In the former case the standard of speed constancy is lowered, as will be clear from what has been described hereinabove in connection with Figure 1, and in the latter case the speed standard is raised.

It will thus be seen that there has been provided in this invention a system and apparatus in which the various objects hereinbefore noted, together with many thoroughly practical advantages, are successfully achieved. It will be seen that the apparatus makes it possible to meet a wide variety of conditions that arise in practice and that the manifold advantages of the carbon pile type of regulator may be achieved even though per se the carbon pile regulator is unsuited to the particular electrical characteristics met with or is per se of insufficient range of action.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, a source of electrical energy responsive to changes in speed of said motor for affecting the energization of said coils, a plurality of rheostats individually affecting the actions of said carbon piles and said coils, and means for conjointly affecting the setting of said rheostats.

2. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, and a generator for energizing said coils and connected to be responsive to speed changes in said motor.

3. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, means responsive to speed changes of said motor for affecting the energization of said coils, and a variable resistance for changing the standard of operation of at least one of said coils.

4. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, a generator for energizing said coils and connected to be responsive to speed changes in said motor, and means for changing the standard of operation of said second generator with respect to said coils.

5. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, means responsive to speed changes of said motor for affecting the energization of said coils, and a variable resistance for affecting the range of action of one of said carbon piles.

6. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, means responsive to speed changes of said motor for affecting the energization of said coils, means for changing the range of action of one of said carbon piles, and means for changing the standard of operation of said speed-responsive means.

7. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, means responsive to speed changes of said motor for affecting the energization of said coils, a rheostat for affecting the range of action of one of said carbon piles, a rheostat for affecting the range of action of the other of said carbon piles, and means for conjointly operating said rheostats.

8. In apparatus of the class described, in combination, a motor, a carbon pile affecting the speed of said motor, a coil affecting said carbon pile, a generator supplying energy to said motor, a carbon pile for varying the voltage of said generator, a coil controlling said second carbon pile, means responsive to speed changes of said motor for affecting the range of action of one of said carbon piles, a rheostat for affecting the action of one of said carbon piles, a rheostat for affecting the standard of operation of one of said coils, and means for conjointly operating said rheostats.

9. In apparatus of the class described, in combination, a motor, a generator supplying energy to said motor, a carbon pile for varying the voltage of said generator, electromagnetic means responsive to changes in speed of said motor for controlling said pile, means for changing the range of action of said carbon pile, means for changing the standard of operation of said electromagnetic means, means for conjointly operating said standard-changing means, and means for changing at will the relation between the change effected by one of said standard-changing means and the change effected by the other of said standard-changing means.

10. In apparatus of the class described, in combination, a motor, a carbon pile for affecting the speed of said motor, electromagnetic means responsive to speed changes in said motor for controlling said carbon pile, means for changing the standard of operation of said carbon pile, means for changing the standard of operation of said electromagnetic means, means for conjointly operating said standard-changing means, and means for determining at will the relation of the change effected by one of said standard-changing means to the change effected by the other of said standard-changing means.

11. In apparatus of the class described, in combination, a motor, a variable resistance affecting the speed of said motor, a generator, a variable resistance affecting the voltage supplied by said generator to said motor, and electromagnetic means responsive to changes in speed of said motor for controlling said variable resistances.

12. In apparatus of the class described, in combination, a motor, a variable resistance affecting the speed of said motor, a generator, a variable resistance affecting the voltage supplied by said generator to said motor, electromagnetic means responsive to changes in speed of said motor for controlling said variable resistances, and means for changing the range of action of one of said variable resistances.

13. In apparatus of the class described, in combination, a motor, a variable resistance affecting the speed of said motor, electromagnetic means for controlling said variable resistance, a source of energy for said motor, a variable resistance for varying the voltage of the energy supplied to said motor, electromagnetic means for controlling said second variable resistance, means responsive to changes in speed of said motor for affecting said two electromagnetic means, a plurality of means for individually affecting the action of said variable resistances and said two electromagnetic means, and means for conjointly affecting the setting of said last-mentioned means.

14. In apparatus of the class described, in combination, a motor, a variable resistance affecting the speed of said motor, electromagnetic means for controlling said variable resistance, a source of energy for said motor, a variable resistance for varying the voltage of the energy supplied to said motor, electromagnetic means for controlling said second variable resistance, means responsive to changes in speed of said motor for affecting said two electromagnetic means, a plurality of variable resistances for individually affecting the action of said first and second variable resistances and said two electromagnetic means, and means for conjointly setting said plurality of variable resistances.

15. In apparatus of the class described, in combination, a motor, a variable resistance affecting the speed of said motor, electromagnetic means for controlling said variable resistance, a source of energy for said motor, a variable resistance for varying the voltage of the energy supplied to said motor, electromagnetic means for controlling said second variable resistance, means responsive to changes in speed of said motor for affecting said two electromagnetic means, means for changing the standard of operation of one of said variable resistances, and means for changing the standard of operation of one of said electromagnetic means.

16. In apparatus of the class described, in combination, a motor, a variable resistance affecting the speed of said motor, electromagnetic means for controlling said variable resistance, a source of energy for said motor, a variable resistance for varying the voltage of the energy supplied to said motor, electromagnetic means for controlling said second variable resistance, means responsive to changes in speed of said motor for affecting said two electromagnetic means, and means for changing the standard of operation of said speed-responsive means.

17. In apparatus of the class described, in combination, a motor, a variable resistance affecting the speed of said motor, electromagnetic means for controlling said variable resistance, a source of energy for said motor, a variable resistance for varying the voltage of the energy supplied to said motor, electromagnetic means for controlling said second variable resistance, means responsive to changes in speed of said motor for affecting said two electromagnetic means, said electromagnetic means being connected in series, and a device in series with said serially connected electromagnetic means for changing the standard of operation thereof.

18. In apparatus of the class described, in combination, a motor, a variable resistance affecting the speed of said motor, electromagnetic means for controlling said variable resistance, a source of energy for said motor, a variable resistance for varying the voltage of the energy supplied to said motor, electromagnetic means for controlling said second variable resistance, means responsive to changes in speed of said motor for affecting said two electromagnetic means, said two electromagnetic means comprising two coils and said two coils being connected in series, and means for changing the standard of operation thereof.

19. In apparatus of the class described, in combination, a motor, a carbon pile affecting the speed of said motor, electromagnetic means for affecting said carbon pile, a source for supplying said motor with energy, means for varying the voltage of the energy supplied to said motor, electromagnetic means for controlling said last-mentioned means, and means for changing the standard of operation of said carbon pile and at least one of said electromagnetic means.

20. In apparatus of the class described, in combination, a motor, a carbon pile affecting the speed of said motor, electromagnetic means for affecting said carbon pile, a source for supplying said motor with energy, means for varying the voltage of the energy supplied to said motor, electromagnetic means for controlling said last-mentioned means, and jointly controlled means for changing the standard of operation of said carbon pile and at least one of said electromagnetic means.

21. In apparatus of the class described, in combination, a motor, a carbon pile affecting the speed of said motor, electromagnetic means for affecting said carbon pile, a source for supplying said motor with energy, means for varying the voltage of the energy supplied to said motor, electromagnetic means for controlling said last-mentioned means, means responsive to speed changes of said motor for affecting one of said electromagnetic means, and means for changing the standard of operation of said speed responsive means and said two electromagnetic means.

22. In apparatus of the class described, in combination, a motor, a carbon pile affecting the speed of said motor, electromagnetic means for affecting said carbon pile, a source for supplying said motor with energy, means for varying the voltage of the energy supplied to said motor, electromagnetic means for controlling said last-mentioned means, means for changing the standard of operation of one of said above-mentioned means, means for changing the standard of operation of said carbon pile, and means for conjointly controlling said standard-changing means.

23. In apparatus of the class described, in combination, a motor, and a source for supplying said motor with electrical energy, means responsive to the speed of said motor, regulating means controlled by said speed-responsive means for affecting the voltage supplied by said source, regulating means controlled by said responsive means for affecting the excitation of said motor, means for changing the standard of operation of said first regulating means, means for changing the standard of operation of said second regulating means, and means for conjointly controlling said standard-changing means.

24. In apparatus of the class described, in combination, a motor, and a source for supplying said motor with electrical energy, means responsive to the speed of said motor, regulating means controlled by said speed-responsive means for affecting the voltage supplied by said source, regulating means controlled by said responsive means for affecting the excitation of said motor, means for changing the standard of operation of said first regulating means, means for changing the standard of operation of said second regulating means, means for changing the standard of operation of said speed-responsive means, and means for conjointly affecting the standard of operation of said three standard-changing means.

LOUIS H. VON OHLSEN.